(12) United States Patent
Mukasa

(10) Patent No.: US 12,174,412 B2
(45) Date of Patent: Dec. 24, 2024

(54) MULTI-CORE FIBER, MULTI-CORE FIBER RIBBON, METHOD OF MANUFACTURING MULTI-CORE FIBER, AND METHOD OF PROCESSING MULTI-CORE FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 233 days.

(21) Appl. No.: 17/894,292

(22) Filed: Aug. 24, 2022

(65) Prior Publication Data

US 2022/0413208 A1 Dec. 29, 2022

Related U.S. Application Data

(63) Continuation of application No. PCT/JP2021/008828, filed on Mar. 5, 2021.

(30) Foreign Application Priority Data

Mar. 17, 2020 (JP) ................................. 2020-046480

(51) Int. Cl.
*G02B 6/02* (2006.01)
*G02B 6/028* (2006.01)

(52) U.S. Cl.
CPC ....... *G02B 6/02042* (2013.01); *G02B 6/0288* (2013.01)

(58) Field of Classification Search
CPC ........................... G02B 6/0288; G02B 6/02042
See application file for complete search history.

(56) References Cited

U.S. PATENT DOCUMENTS 7,676,129 B1   3/2010   Bookbinder et al.
8,971,685 B2   3/2015   Matsuo et al.
(Continued)

FOREIGN PATENT DOCUMENTS

JP    06-024781 A    2/1994
JP    2006-220824 A  8/2006
(Continued)

OTHER PUBLICATIONS

International Search Report issued May 25, 2021 in PCT/JP2021/008828 filed on Mar. 5, 2021, citing documents 1, 3-5 & 14-20 therein, 3 pages.

(Continued)

*Primary Examiner* — Sung H Pak
(74) *Attorney, Agent, or Firm* — Oblon, McClelland, Maier & Neustadt, L.L.P.

(57) ABSTRACT

A multi-core fiber includes: a plurality of core portions each including a central core portion, an intermediate layer formed on an outer periphery of the central core portion, and a trench layer formed on an outer periphery of the intermediate layer; and a cladding portion formed on an outer periphery of the plurality of core portions, wherein in each of the plurality of core portions, $\Delta 1 > \Delta 2 > \Delta 3$ and $0\% > \Delta 3 > -0.3\%$ are satisfied, where $\Delta 1$ is an average maximum relative refractive-index difference of the central core portion, $\Delta 2$ is an average relative refractive-index difference of the intermediate layer, and $\Delta 3$ is an average relative refractive-index difference of the trench layer, with respect to the cladding portion.

19 Claims, 8 Drawing Sheets

(56) References Cited

U.S. PATENT DOCUMENTS

| | | |
|---|---|---|
| 2006/0039665 A1 | 2/2006 | Matsuo et al. |
| 2008/0056654 A1 | 3/2008 | Bickham et al. |
| 2010/0046899 A1 | 2/2010 | Bickham et al. |
| 2013/0183016 A1* | 7/2013 | Imamura ............ G02B 6/02042 385/127 |
| 2015/0160408 A1 | 6/2015 | Bickham et al. |
| 2020/0379168 A1 | 12/2020 | Mukasa |

FOREIGN PATENT DOCUMENTS

| | | |
|---|---|---|
| JP | 2010-503019 A | 1/2010 |
| JP | 2012-118495 A | 6/2012 |
| JP | 2015-079145 A | 4/2015 |
| JP | 2016-075938 A | 5/2016 |
| JP | 6153447 B2 | 6/2017 |
| JP | 2018-021999 A | 2/2018 |
| WO | WO 2004/092794 A1 | 10/2004 |
| WO | WO 2019/168054 A1 | 9/2019 |

OTHER PUBLICATIONS

Extended European Search Report issued Feb. 21, 2024 in European Patent Application No. 21771133.2, citing references 1-2 and 15 therein, 10 pages.

Indian Office Action issued Nov. 30, 2022 in Indian Patent Application No. 202247052559, 9 pages.

* cited by examiner

MULTI-CORE FIBER, MULTI-CORE FIBER RIBBON, METHOD OF MANUFACTURING MULTI-CORE FIBER, AND METHOD OF PROCESSING MULTI-CORE FIBER

This application is a continuation of International Application No. PCT/JP2021/008828, filed on Mar. 5, 2021 which claims the benefit of priority of the prior Japanese Patent Application No. 2020-046480, filed on Mar. 17, 2020, the entire contents of which are incorporated herein by reference.

BACKGROUND

The present disclosure relates to a multi-core fiber, a multi-core fiber ribbon, a method of manufacturing a multi-core fiber, and a method of processing a multi-core fiber.

In the fields of datacom and telecom, multi-core fibers are known as optical fibers for realizing high-density optical fiber cables. The multi-core fibers described in JP 2012-118495 A and JP 2016-075938 A include core portions that employ a trench structure in order to suppress inter-core crosstalk.

SUMMARY

In the multi-core fibers described in JP 2012-118495 A and JP 2016-075938 A, the relative refractive-index difference $\Delta 3$ of a trench layer with respect to a cladding portion is smaller than $-0.3\%$. In the case where the cladding portion is made of pure quartz glass, when the relative refractive-index difference $\Delta 3$ is to be smaller than $-0.3\%$, it is necessary to increase a dopant such as fluorine that lowers the refractive index of quartz-based glass, and thus the manufacturability of the trench layer or the optical fiber including the trench layer is lowered. Since a multi-core fiber includes a plurality of core portions, when each core portion includes a trench layer, the impact of low manufacturability of the trench layer is accumulated, and thus the manufacturability is further lowered compared to a single-core fiber.

There is a need for a multi-core fiber, a multi-core fiber ribbon, a method of manufacturing a multi-core fiber, and a method of processing a multi-core fiber, in which inter-core crosstalk is suppressed and a decrease in manufacturability is suppressed.

According to one aspect of the present disclosure, there is provided a multi-core fiber including: a plurality of core portions each including a central core portion, an intermediate layer formed on an outer periphery of the central core portion, and a trench layer formed on an outer periphery of the intermediate layer; and a cladding portion formed on an outer periphery of the plurality of core portions, wherein in each of the plurality of core portions, $\Delta 1 > \Delta 2 > \Delta 3$ and $0\% > \Delta 3 > -0.3\%$ are satisfied, where $\Delta 1$ is an average maximum relative refractive-index difference of the central core portion, $\Delta 2$ is an average relative refractive-index difference of the intermediate layer, and $\Delta 3$ is an average relative refractive-index difference of the trench layer, with respect to the cladding portion.

According to another aspect of the present disclosure, there is provided a method of processing a multi-core fiber including processing the multi-core fiber using a jig or device for processing a standard optical fiber having a cladding diameter of 125 μm.

According to still another aspect of the present disclosure, there is provided a multi-core fiber ribbon including a plurality of the multi-core fibers being arranged in parallel.

According to further aspect of the present disclosure, there is provided a method of manufacturing the multi-core fiber including: a first step of preparing a plurality of core members to be at least a part of the plurality of core portions; a second step of preparing a cladding member to be at least a part of the cladding portion; a third step of forming a preform using the plurality of core members and the cladding member; and a fourth step of drawing the multi-core fiber from the preform.

DETAILED DESCRIPTION

Figure 1:
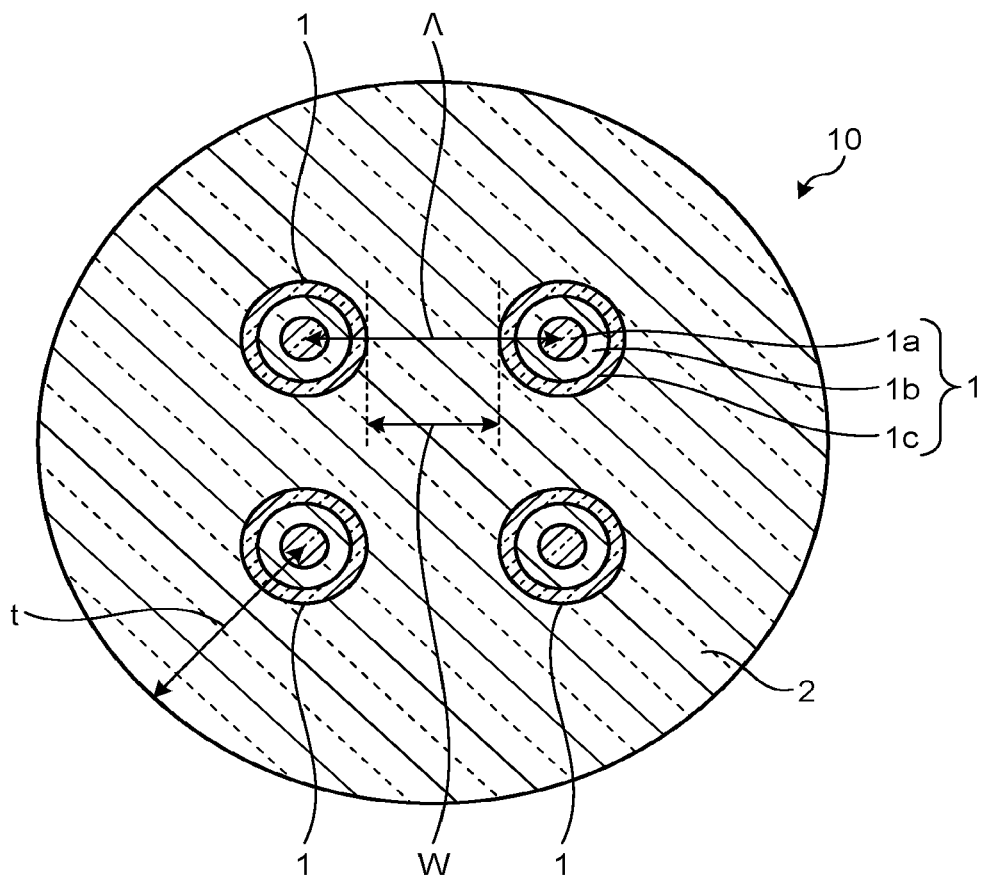
FIG. 1 is a schematic cross-sectional view of a multi-core fiber according to a first embodiment.

Embodiments of the present invention will be described below in detail with reference to the drawings. The present disclosure is not limited to the embodiments described below. In the drawings, the same or corresponding components are appropriately denoted by the same reference numerals. As used herein, cut-off wavelength or effective cut-off wavelength refers to the cable cut-off wavelength defined in International Telecommunication Union (ITU)-T G.650.1. Other terms not specifically defined herein follow the definitions and measurement methods in G.650.1 and G.650.2.

FIG. 1 is a schematic cross-sectional view of a multi-core fiber according to a first embodiment. A multi-core fiber 10 includes four core portions 1 as a plurality of core portions. The multi-core fiber 10 includes a cladding portion 2 formed on the outer peripheries of the four core portions 1. The four core portions 1 are arranged in a square shape centered on the central axis of the cladding portion 2. The multi-core fiber 10 may include a coating layer formed on the outer periphery of the cladding portion 2. Such a coating layer is made of a resin or others that can be used as a coating layer of an optical fiber.

Both the core portion 1 and the cladding portion 2 are made of quartz-based glass. The cladding portion 2 has a substantially circular cross section and has a refractive index lower than the maximum refractive index of the core portion 1.

The core portion 1 has a substantially circular cross section, and has a structure in which a central core portion 1a, an intermediate layer 1b formed on the outer periphery of the central core portion 1a, and a trench layer 1c formed on the outer periphery of the intermediate layer 1b are substantially concentrically formed.

Figure 2:
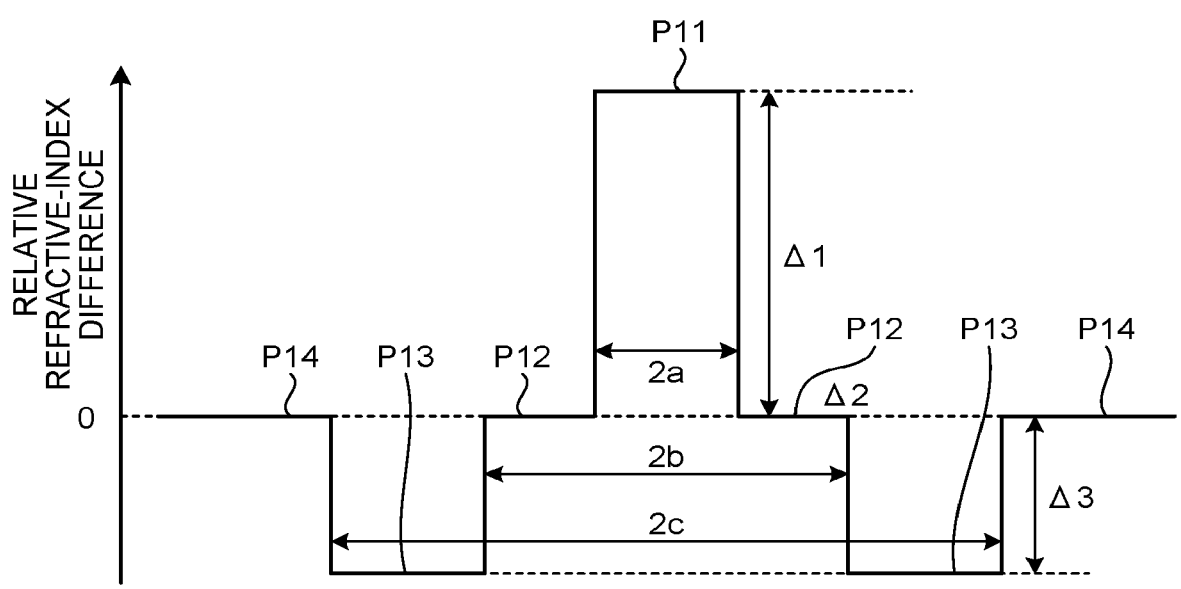
FIG. 2 is a schematic diagram of a refractive index profile of a core portion of the multi-core fiber of FIG. 1 and the periphery of the core portion.

FIG. 2 is a schematic diagram of a refractive index profile of an arbitrary core portion 1 in the multi-core fiber 10 and the cladding portion 2 around the core portion 1. In FIG. 2, a profile P11 indicates the refractive index profile of the central core portion 1a, a profile P12 indicates the refractive index profile of the intermediate layer 1b, a profile P13 indicates the refractive index profile of the trench layer 1c, and a profile P14 indicates the refractive index profile of the cladding portion 2.

The central core diameter of the central core portion 1a is denoted by 2a, and an average maximum relative refractive-index difference of the central core portion 1a with respect to the cladding portion 2 is $\Delta 1$. The refractive index profile of the central core portion 1a is not only a geometrically ideal step-shaped profile, but also may have a profile in which the shape of the top portion is not flat but unevenness is formed due to manufacturing characteristics or may have a shape in which a base is drawn from the top portion. In this case, the refractive index in a substantially flat region at the top of the refractive-index profile within the range of the core diameter 2a in the manufacturing design becomes an indicator for determining $\Delta 1$.

The outer diameter of the intermediate layer 1b is 2b, and the average relative refractive-index difference of the intermediate layer 1b with respect to the cladding portion 2 is $\Delta 2$. The inner diameter of the trench layer 1c is 2b, the outer diameter of the trench layer is 2c, and the average relative refractive-index difference of the trench layer 1c with respect to the cladding portion 2 is $\Delta 3$.

In the multi-core fiber 10, $\Delta 1 > \Delta 2 > \Delta 3$ and $0\% > \Delta 3 > -0.3\%$ are satisfied in each core portion 1. In other words, in the multi-core fiber 10, each core portion 1 has a trench-type refractive index profile. For example, the above inequality is satisfied, when the central core portion 1a is made of quartz glass added with a dopant such as germanium (Ge) that increases the refractive index, the intermediate layer 1b hardly contains a dopant that changes the refractive index, the central core portion 1a is made of quartz glass added with a dopant such as fluoride (F) that decreases the refractive index, and the cladding portion 2 is made of pure quartz glass. Pure quartz glass is extremely high-purity quartz glass that contains substantially no dopant that changes the refractive index and has a refractive index of about 1.444 at a wavelength of 1550 nm.

Further, in the multi-core fiber 10, $\Delta 3 > -0.3\%$ is satisfied in each core portion 1, such that it is possible to relatively reduce the addition amount of a dopant that reduces the refractive index to be added to the trench layer 3, for example, fluorine. Thus, the multi-core fiber 10 suppresses a decrease in manufacturability, and is excellent in mass productivity, for example.

Further, in the multi-core fiber 10, as illustrated in FIG. 1, $w/\Lambda$ is 0.179 or less, for example, where $\Lambda$ is the center distance between the most adjacent core portions 1 among the core portions 1, and w is the shortest distance between the trench layers 1c of the most adjacent core portions 1. When $w/\Lambda$ is 0.179 or less, a trench width $(c-b)/2$ of the trench layers 1c is relatively large, such that, even if the absolute value of $\Delta 3$ of the trench layer 1c is small, crosstalk (inter-core crosstalk) between the core portions 1 can be made relatively high and the bending loss characteristics can be made relatively good. The fact that $w/\Lambda$ is 0.179 or less and the trench width $(c-b)/2$ is relatively large means that the center of the intensity of the field of light propagating through the core portion 1 is relatively distant from the interface between the trench layer 1c and the cladding portion 2. As a result, an increase in propagation loss of the core portion 1 due to the existence of the interface is suppressed.

From the viewpoint of versatility, it is preferable that the optical characteristics of the multi-core fiber 10 conform to a standard widely accepted as a standard of an optical fiber, such as the standard (G.652 standard) defined by ITU-T G.652 or even the G.657 standard.

As a result of comprehensive and diligent study on design parameters such as 2a, 2b, 2c, $\Delta 1$, $\Delta 2$, and $\Delta 3$ illustrated in FIG. 2, the present inventor has confirmed that the design parameters preferably satisfy the following characteristics in each of the core portions 1. In other words, when $\Delta 3 > -0.3\%$ is satisfied, (1) b/a is preferably 1.9 or more and 3.0 or less, and c/a is preferably 3.6 or more and 4.4 or less. (2) $\Delta 1$ is preferably 0.35% or more and 0.39%, or less. (3) $\Delta 2$ is preferably $-0.05\%$, or more and 0.04% or less. Further, (4) 2a is preferably set such that the effective cut-off wavelength is 1000 nm or more and 1260 nm or less.

The present inventor has confirmed that satisfying one or more of the conditions (1) to (4) described above allows the multi-core fiber 10 that satisfies the following optical characteristics of the G.657 $\Delta 2$ standard in (5) to (7) described below to be easily realized. In other words, (5) the effective cut-off wavelength is 1000 nm or more and 1260 nm or less, (6) the mode field diameter at a wavelength of 1310 nm is 8.6 µm or more and 9.2 µm or less, and (7) the bending loss at a wavelength of 1550 nm when bent at a diameter of 20 mm is 1.57 dB/m or less. Regarding the chromatic dispersion characteristics, when the multi-core fiber 10 is applied to communication using a digital coherent communication technology, it is possible to compensate the dispersion to some extent, but it is preferable to satisfy the optical characteristics of the G.657 $\Delta 2$ standard in (8) and (9) described below. In other words, (8) the zero-dispersion wavelength is 1300 nm or more and 1324 nm or less, and (9) the dispersion slope at the zero-dispersion wavelength is 0.092 ps/nm$^2$/km or less.

The present inventor has confirmed that when $\Lambda$ is 37 µm or more and 41 µm or less, the inter-core crosstalk between the two most adjacent core portions 1 can be easily set to −25 dB or less, or even −30 dB or less in the multi-core fiber 10 having a length of 100 km.

Further, from the viewpoint of increasing the density of an optical fiber cable, the outer diameter (cladding diameter) of the cladding portion 2 of the multi-core fiber 10 is preferably a small diameter. Regarding the multi-core fiber 10, it has been confirmed that in a case where one or more of the conditions (1) to (4) described above are satisfied, when the cladding thickness t of the cladding portion 2 on the outer peripheral side is 25 μm or less with respect to the core portion 1 positioned on the outermost peripheral side, the excessive loss due to the diameter reduction is negligible. As illustrated in FIG. 1, the cladding thickness t of the cladding portion 2 on the outer peripheral side with respect to the core portion 1 positioned on the outermost peripheral side is a distance from the center of the core portion 1 closest to the outer periphery of the cladding portion 2 to the outer periphery of the cladding portion 2. In the arrangement of the core portions 1 illustrated in FIG. 1, the distance from the center to the outer periphery of the cladding portion 2 is equal in any of the core portions 1. Such a cladding thickness t may be hereinafter referred to as a minimum cladding thickness.

As described above, the multi-core fiber 10 according to the first embodiment is such that inter-core crosstalk is suppressed by employing the trench-type refractive index profile, and a decrease in manufacturability is suppressed by satisfying Δ3>−0.3%.

Figure 3:
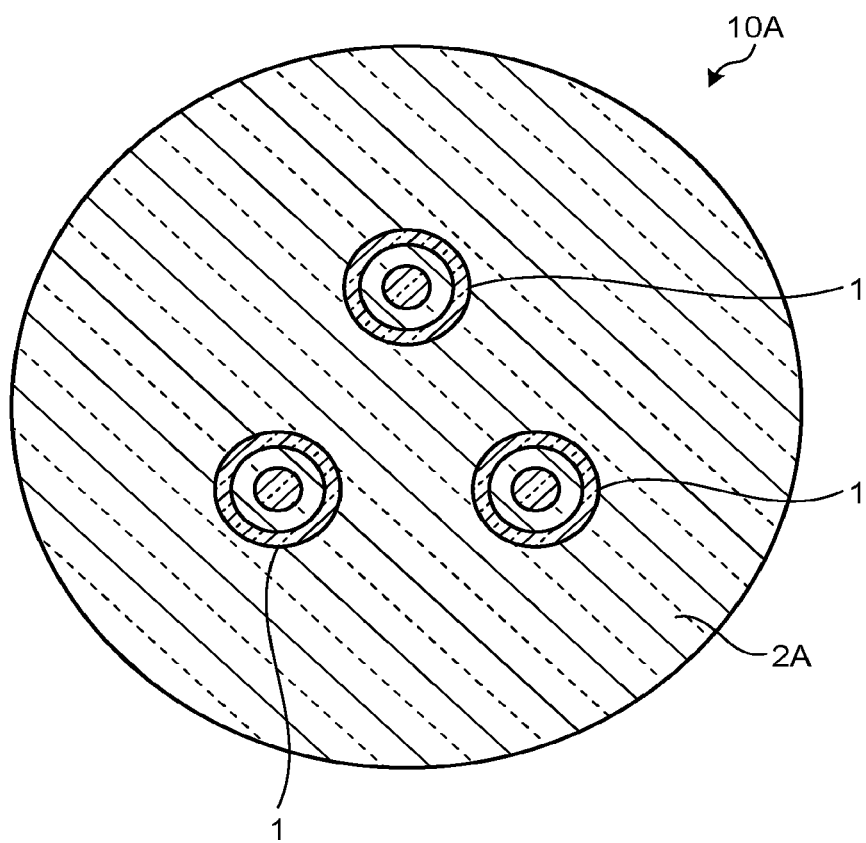
FIG. 3 is a schematic cross-sectional view of a multi-core fiber according to a second embodiment.

FIG. 3 is a schematic cross-sectional view of a multi-core fiber according to a second embodiment. A multi-core fiber 10A includes three core portions 1 as a plurality of core portions. The multi-core fiber 10A includes a cladding portion 2 formed on the outer peripheries of the three core portions 1. The three core portions 1 are arranged in an equilateral triangle shape centered on the central axis of the cladding portion 2.

The multi-core fiber 10A is different from the multi-core fiber 10 according to the first embodiment in the number and arrangement of the core portions 1, but is the same as the multi-core fiber according to the first embodiment in other configurations, for example, in constituent materials and values of design parameters. Therefore, the multi-core fiber 10A is also such that inter-core crosstalk is suppressed, and a decrease in manufacturability is suppressed.

As an example, a sample of a multi-core fiber was manufactured using a manufacturing method described below. Samples Nos. 1 to 35 were manufactured by designing both the four-core structure having four cores illustrated in FIG. 1 and the three-core structure illustrated in FIG. 3 so as to satisfy the above-described conditions (1) to (4).

The design parameters and optical characteristics of samples Nos. 1 to 35 are illustrated in Tables 1A and 1B. In the tables, Λ is set such that inter-core crosstalk is −30 dB at 100 km. The fiber diameter means the cladding diameter. "λ0" means zero-dispersion wavelength. "Dispersion Slope @ λ0" means dispersion slope at the zero-dispersion wavelength. "MFD" means mode field diameter. "λcc" means cable cut-off wavelength (effective cut-off wavelength). As illustrated in Tables 1A and 1B, all of samples Nos. 1 to 35 satisfied the optical characteristics of the G.657 Δ2 standard in (5) to (9), and inter-core crosstalk at a length of 100 km was −25 dB or less.

TABLE 1A

| Item Unit | Δ1 % | Δ2 % | Δ3 % | b/a | c/a | 2a μm | Λ μm | Minimum Cladding Thickness μm | w/Λ | Fiber Diameter @Three-Core μm | Fiber Diameter @Four-Core μm | λ0 nm | Dispersion Slope@λ0 ps/nm²/km | MFD @1310 nm μm | λcc nm | Bending Loss @1550 nm @20 mm dB/m |
|---|---|---|---|---|---|---|---|---|---|---|---|---|---|---|---|---|
| No. 1 | 0.39 | 0 | −0.2 | 3.0 | 4.0 | 8.2 | 37 | 38.6 | 0.114 | 120 | 130 | 1312 | 0.088 | 8.68 | 1256 | 1.31 |
| No. 2 | 0.37 | 0 | −0.2 | 2.6 | 4.0 | 8.3 | 41 | 39.4 | 0.190 | 126 | 137 | 1311 | 0.089 | 8.86 | 1248 | 1.56 |
| No. 3 | 0.37 | 0 | −0.2 | 2.4 | 4.0 | 8.3 | 40 | 39.0 | 0.170 | 124 | 135 | 1309 | 0.09 | 8.84 | 1249 | 1.15 |
| No. 4 | 0.37 | 0 | −0.2 | 2.2 | 4.0 | 8.3 | 39.5 | 38.6 | 0.159 | 123 | 133 | 1306 | 0.091 | 8.82 | 1255 | 0.87 |
| No. 5 | 0.37 | 0 | −0.2 | 2.0 | 4.0 | 8.0 | 39 | 39.9 | 0.179 | 125 | 135 | 1306 | 0.091 | 8.64 | 1213 | 1.29 |
| No. 6 | 0.37 | 0 | −0.2 | 2.0 | 4.0 | 8.2 | 39 | 38.8 | 0.159 | 123 | 133 | 1304 | 0.092 | 8.73 | 1243 | 1.04 |
| No. 7 | 0.37 | 0 | −0.2 | 3.0 | 4.6 | 8.0 | 40.5 | 40.1 | 0.091 | 127 | 137 | 1319 | 0.086 | 8.73 | 1230 | 1.42 |
| No. 8 | 0.37 | 0 | −0.2 | 3.0 | 4.6 | 8.1 | 41 | 39.5 | 0.091 | 126 | 137 | 1317 | 0.087 | 8.76 | 1247 | 1.28 |
| No. 9 | 0.37 | −0.05 | −0.2 | 3.0 | 4.0 | 8.7 | 40.5 | 38.8 | 0.141 | 124 | 135 | 1301 | 0.09 | 8.71 | 1246 | 1.52 |
| No. 10 | 0.36 | 0 | −0.2 | 2.2 | 4.0 | 8.3 | 40 | 39.7 | 0.170 | 126 | 136 | 1307 | 0.091 | 8.89 | 1242 | 1.49 |
| No. 11 | 0.36 | 0 | −0.2 | 2.2 | 4.0 | 8.4 | 40 | 39.2 | 0.160 | 125 | 135 | 1306 | 0.091 | 8.94 | 1255 | 1.12 |
| No. 12 | 0.35 | 0 | −0.2 | 2.2 | 4.0 | 8.5 | 40 | 39.9 | 0.150 | 126 | 136 | 1305 | 0.091 | 9.05 | 1255 | 1.46 |
| No. 13 | 0.38 | 0 | −0.2 | 2.2 | 4.0 | 8.2 | 39 | 38.0 | 0.159 | 121 | 131 | 1307 | 0.09 | 8.71 | 1255 | 0.821 |
| No. 14 | 0.39 | 0 | −0.2 | 2.2 | 4.0 | 8.1 | 39 | 37.5 | 0.169 | 120 | 130 | 1308 | 0.09 | 8.6 | 1255 | 0.806 |
| No. 15 | 0.37 | −0.02 | −0.2 | 2.2 | 4.0 | 8.3 | 39.5 | 39.0 | 0.159 | 124 | 134 | 1305 | 0.09 | 8.69 | 1238 | 0.943 |
| No. 16 | 0.37 | −0.04 | −0.2 | 2.2 | 4.0 | 8.5 | 39 | 38.3 | 0.128 | 122 | 132 | 1302 | 0.091 | 8.66 | 1251 | 0.686 |
| No. 17 | 0.37 | 0.02 | −0.2 | 2.2 | 4.0 | 8.2 | 40 | 38.6 | 0.180 | 123 | 134 | 1309 | 0.091 | 8.92 | 1255 | 1.24 |
| No. 18 | 0.37 | 0.04 | −0.2 | 2.2 | 4.0 | 7.9 | 40.5 | 39.5 | 0.220 | 126 | 136 | 1313 | 0.091 | 8.95 | 1246 | 1.40 |
| No. 19 | 0.37 | 0 | −0.18 | 2.2 | 4.0 | 8.3 | 40 | 39.0 | 0.170 | 124 | 135 | 1307 | 0.09 | 8.82 | 1248 | 1.13 |

TABLE 1B

| Item Unit | Δ1 % | Δ2 % | Δ3 % | b/a | c/a | 2a μm | Λ μm | Minimum Cladding Thickness μm | w/Λ | Fiber Diameter @Three-Core μm | Fiber Diameter @Four-Core μm | λ0 nm | Dispersion Slope@λ0 ps/nm²/km | MFD @1310 nm μm | λcc nm | Bending Loss @1550 nm @20 mm dB/m |
|---|---|---|---|---|---|---|---|---|---|---|---|---|---|---|---|---|
| No. 20 | 0.37 | 0 | −0.16 | 2.2 | 4.0 | 8.3 | 41 | 39.4 | 0.190 | 126 | 137 | 1307 | 0.09 | 8.83 | 1241 | 1.57 |
| No. 21 | 0.37 | 0 | −0.16 | 2.2 | 4.0 | 8.4 | 40.5 | 38.9 | 0.170 | 125 | 135 | 1306 | 0.091 | 8.87 | 1256 | 1.45 |
| No. 22 | 0.37 | 0 | −0.22 | 2.2 | 4.0 | 8.2 | 39 | 38.7 | 0.159 | 122 | 133 | 1307 | 0.091 | 8.77 | 1249 | 0.901 |

TABLE 1B-continued

| Item Unit | Δ1 % | Δ2 % | Δ3 % | b/a | c/a | 2a μm | Λ μm | Minimum Cladding Thickness μm | w/Λ | Fiber Diameter @Three-Core μm | Fiber Diameter @Four-Core μm | λ0 nm | Dispersion Slope@λ0 ps/nm$^2$/km | MFD @1310 nm μm | λcc nm | Bending Loss @1550 nm @20 mm dB/m |
|---|---|---|---|---|---|---|---|---|---|---|---|---|---|---|---|---|
| No. 23 | 0.37 | 0 | −0.24 | 2.2 | 4.0 | 8.2 | 39 | 38.3 | 0.159 | 122 | 132 | 1307 | 0.091 | 8.77 | 1256 | 0.842 |
| No. 24 | 0.37 | 0 | −0.26 | 2.2 | 4.0 | 8.1 | 38 | 38.5 | 0.147 | 121 | 131 | 1307 | 0.091 | 8.72 | 1251 | 0.806 |
| No. 25 | 0.37 | 0 | −0.2 | 2.2 | 3.8 | 8.3 | 40 | 39.1 | 0.212 | 124 | 135 | 1308 | 0.09 | 8.78 | 1241 | 1.36 |
| No. 26 | 0.37 | 0 | −0.2 | 2.2 | 3.8 | 8.4 | 40 | 38.7 | 0.202 | 124 | 134 | 1307 | 0.09 | 8.82 | 1257 | 1.08 |
| No. 27 | 0.37 | 0 | −0.2 | 2.2 | 3.6 | 8.5 | 40.5 | 38.7 | 0.244 | 124 | 135 | 1305 | 0.091 | 8.87 | 1256 | 1.43 |
| No. 28 | 0.37 | 0 | −0.2 | 2.2 | 4.2 | 8.2 | 39 | 38.5 | 0.117 | 122 | 132 | 1309 | 0.09 | 8.74 | 1256 | 0.743 |
| No. 29 | 0.37 | 0 | −0.2 | 2.2 | 4.4 | 8.1 | 38.5 | 38.4 | 0.074 | 121 | 131 | 1310 | 0.09 | 8.71 | 1246 | 0.641 |
| No. 30 | 0.37 | 0 | −0.2 | 1.9 | 3.9 | 8.3 | 39 | 38.4 | 0.170 | 122 | 132 | 1301 | 0.092 | 8.73 | 1250 | 1.01 |
| No. 31 | 0.37 | 0 | −0.2 | 2.1 | 4.3 | 8.1 | 38.5 | 38.5 | 0.095 | 121 | 131 | 1308 | 0.091 | 8.68 | 1249 | 0.697 |
| No. 32 | 0.37 | 0 | −0.2 | 2.0 | 4.2 | 8.1 | 39 | 38.6 | 0.128 | 122 | 132 | 1307 | 0.091 | 8.65 | 1243 | 0.819 |
| No. 33 | 0.37 | 0 | −0.2 | 2.0 | 4.2 | 8.2 | 38.5 | 38.1 | 0.105 | 121 | 131 | 1305 | 0.091 | 8.69 | 1259 | 0.552 |
| No. 34 | 0.37 | 0 | −0.2 | 1.9 | 4.1 | 8.1 | 39 | 38.9 | 0.148 | 123 | 133 | 1304 | 0.092 | 8.6 | 1234 | 0.830 |
| No. 35 | 0.37 | 0 | −0.2 | 1.9 | 4.1 | 8.2 | 38.5 | 38.3 | 0.127 | 121 | 131 | 1303 | 0.092 | 8.65 | 1250 | 0.503 |

The cladding diameters of the multi-core fibers 10 and 10A will then be described. The cladding diameters of the multi-core fibers 10 and 10A are preferably close to 125 μm conforming to the G.652 standard or the G.657 standard.

Figure 4:
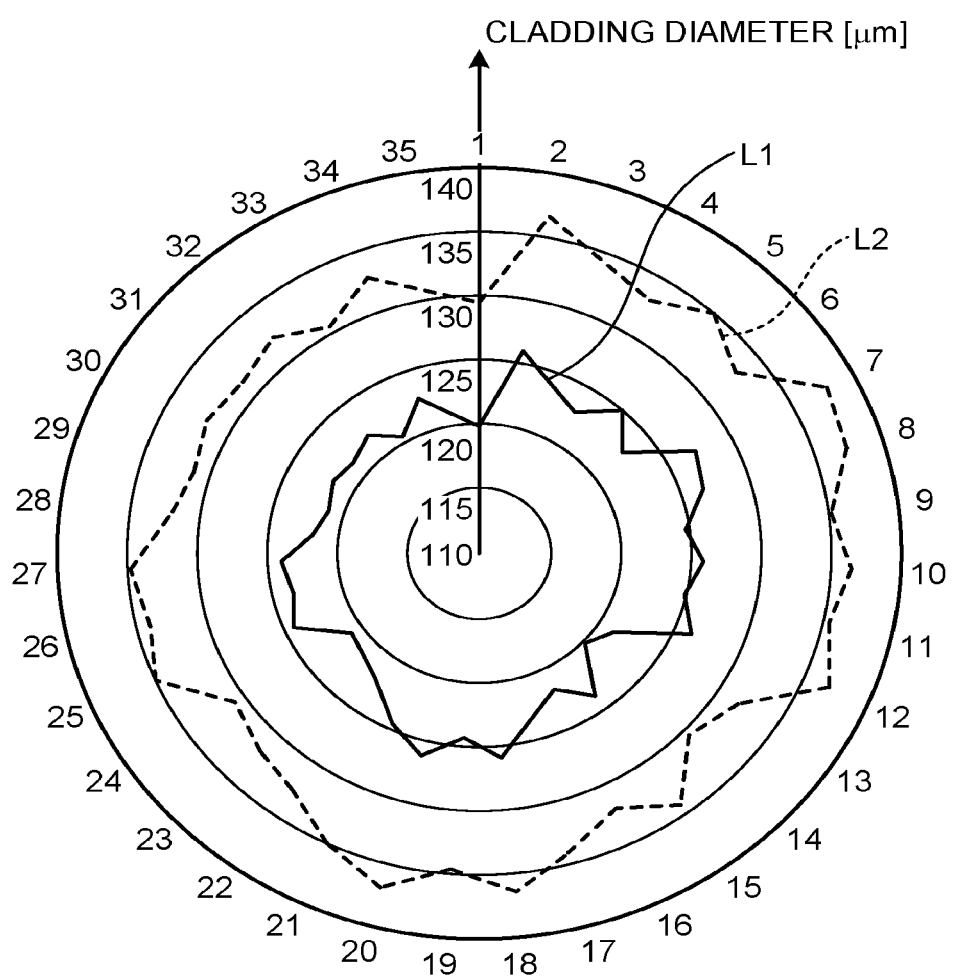
FIG. 4 is a radar chart illustrating the cladding diameter of samples Nos. 1 to 35.

FIG. 4 is a radar chart illustrating the cladding diameters of the multi-core fibers of samples Nos. 1 to 35 in Tables 1A and 1B. In the drawing, a line L1 indicates the cladding diameters of the multi-core fibers of samples Nos. 1 to 35 in the case of a three-core structure, and a line L2 indicates the cladding diameters of the multi-core fibers of sample Nos. 1 to 35 in the case of a four-core structure. As illustrated in the drawing, the cladding diameter is 120 μm or more and 137 μm or less in any of the manufactured samples.

As described above, a multi-core fiber having a cladding diameter of 137 μm or less is more suitable for ensuring long-term reliability of mechanical properties such as fracture characteristics by a screening test. A multi-core fiber having a cladding diameter of 120 μm or more and 137 μm or less has a diameter within ±10% with respect to 125 μm diameter, and thus can be processed using a jig or a device for processing an optical fiber having a cladding diameter of 125 μm. An optical fiber having a cladding diameter of 125 μm may be referred to as a standard optical fiber, and is suitable because jigs or devices for processing are widely used. Such a processing jig or device is, for example, a multi-core fiber coating removal jig, a cutting jig, a fusion splicing device, or others.

Figure 5:
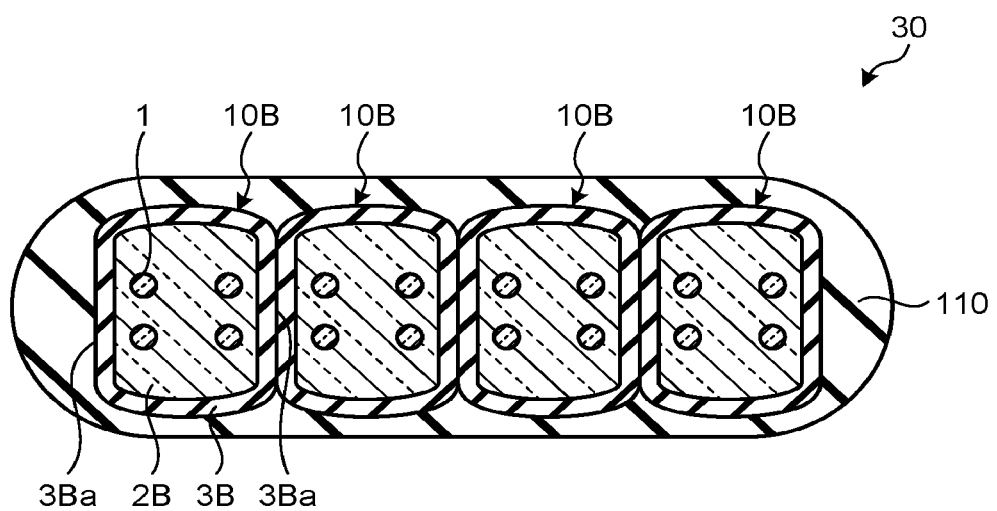
FIG. 5 is a schematic cross-sectional view of a multi-core fiber ribbon according to a third embodiment.

FIG. 5 is a schematic cross-sectional view of a multi-core fiber ribbon according to a third embodiment. The multi-core fiber ribbon 30 illustrated in FIG. 5 has a configuration in which four multi-core fibers 10B are arranged in parallel, and the outer peripheries of the multi-core fibers are collectively coated with a coating layer 110 made of a resin or others. The coating layer 110 is made of a resin or others that can be used as a collective coating layer of an optical fiber ribbon. The four multi-core fibers 10B are an example of a plurality of multi-core fibers.

The multi-core fiber 10B includes four core portions 1, a cladding portion 2B formed on the outer peripheries of the four core portions 1, and a coating layer 3B formed on the outer periphery of the cladding portion 2B. The core portion 1 has the same structure and constituent material as those of the core portion 1 of the first embodiment. The design and arrangement of the core portion 1 preferably satisfy the conditions that w/Λ is 0.179 or less, inter-core crosstalk is −25 dB, or the minimum cladding thickness t is 25 μm or less. Further, it is preferable that one or more of the conditions (1) to (4) are satisfied.

The coating layer 3B is made of a resin or others that can be used as a coating layer of an optical fiber. The coating layer 3B has a non-circular coating portion in which at least a part of an outer surface is deviated from a cylindrical shape along the extending direction of the cladding portion 2B. In the present embodiment, the planar outer surfaces of the coating layer 3B parallel to two opposing sides of a quadrangle formed by the core portions 1 are formed so as to face each other, thereby constituting non-circular coating portions 3Ba.

The cladding portion 2B is made of the same constituent material as the cladding portion 2 of the first embodiment, but is different in that at least a part of the outer surface has a non-circular cladding portion. In the present embodiment, the planar outer surfaces of the cladding portion 2B parallel to two opposing sides of a quadrangle formed by the core portions 1 are formed so as to face each other, thereby constituting non-circular cladding portions. The non-circular cladding portion has a shape along the non-circular coating portion 3Ba of the coating layer 3B.

In the multi-core fiber ribbon 30, each of the multi-core fibers 10B is in contact with an adjacent multi-core fiber 10B at a non-circular coating portion 3Ba. Thus, the arrangement direction of the core portions 1 in each of the multi-core fibers 10B can be easily aligned in the ribbon formation of the four multi-core fibers 10B. For example, in the case of FIG. 5, the arrangement direction of the core portions 1 in each of the multi-core fibers 10B is an arrangement along the parallel direction of the multi-core fibers 10B.

FIGS. 6A, 6B, 6C, 6D, and 6E are schematic cross-sectional views of multi-core fibers according to a fourth, fifth, sixth, seventh, and eighth embodiments, respectively, suitable for the configuration of a multi-core fiber ribbon.

Figure 6A:
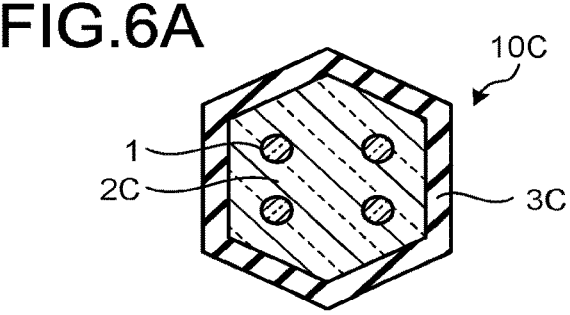
FIG. 6A is a schematic cross-sectional view of a multi-core fiber according to a fourth embodiment suitable for a configuration of a multi-core fiber ribbon.

The multi-core fiber 10C illustrated in FIG. 6A is different from the multi-core fiber 10B in the following two points. The first point is that the outer surface of a coating layer 3C has a non-circular coating portion having a regular hexagonal shape. In the present embodiment, the planar outer surfaces of the coating layer 3C parallel to two opposing sides of a quadrangle formed by the core portions 1 are formed so as to face each other. Another point is that a non-circular cladding portion of a cladding portion 2C has a regular hexagonal shape along the non-circular coating portion of the coating layer 3C.

Figure 6B:
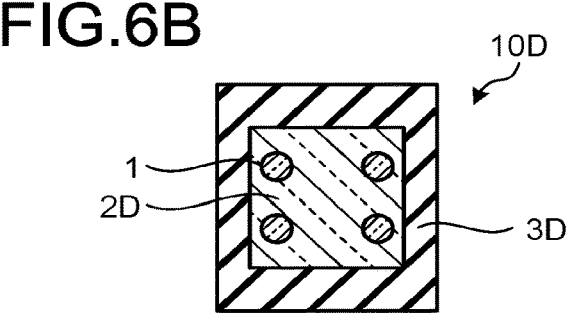
FIG. 6B is a schematic cross-sectional view of a multi-core fiber according to a fifth embodiment suitable for a configuration of a multi-core fiber ribbon.

The multi-core fiber 10D illustrated in FIG. 6B is different from the multi-core fiber 10B in the following two points. The first point is that the outer surface of a coating layer 3D has a non-circular coating portion having a square shape. In the present embodiment, the coating layer 3D is concentric with a quadrangle formed by the core portions 1. Another point is that a non-circular cladding portion of a cladding portion 2D has a square shape along the non-circular coating portion of the coating layer 3D.

Figure 6C:
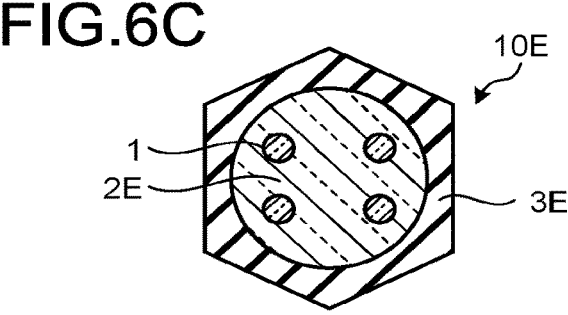
FIG. 6C is a schematic cross-sectional view of a multi-core fiber according to a sixth embodiment suitable for a configuration of a multi-core fiber ribbon.

The multi-core fiber 10E illustrated in FIG. 6C is different from the multi-core fiber 10C in the following one point. The one point is that the outer surface of a coating layer 3E has a non-circular coating portion similar to that of the multi-core fiber 10C, but a cladding portion 2E has a circular shape rather than a shape along the non-circular coating portion of the coating layer 3D.

Figure 6D:
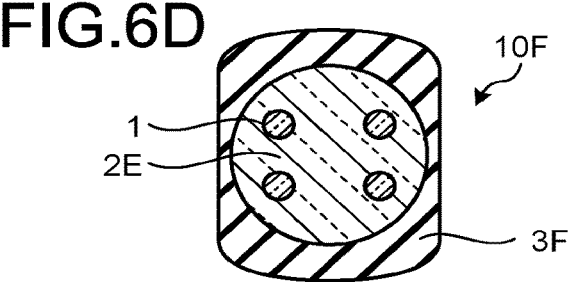
FIG. 6D is a schematic cross-sectional view of a multi-core fiber according to a seventh embodiment suitable for a configuration of a multi-core fiber ribbon.

The multi-core fiber 10F illustrated in FIG. 6D is different from the multi-core fiber 10B in the following one point. The one point is that the outer surface of a coating layer 3F has a non-circular coating portion similar to that of the multi-core fiber 10B, but the cladding portion 2E has a circular shape.

Figure 6E:
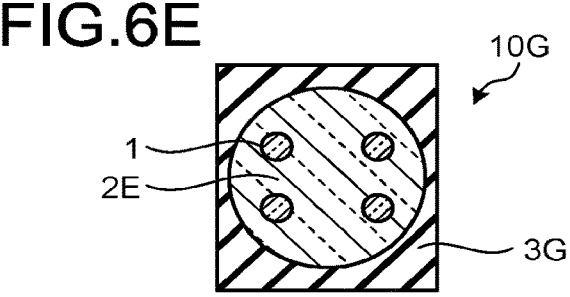
FIG. 6E is a schematic cross-sectional view of a multi-core fiber according to an eighth embodiment suitable for a configuration of a multi-core fiber ribbon.

The multi-core fiber 10G illustrated in FIG. 6E is different from the multi-core fiber 10D in the following point. The one point is that the outer surface of a coating layer 3G has a non-circular coating portion similar to that of the multi-core fiber 10D, but the cladding portion 2E has a circular shape.

In any of the multi-core fibers 10C to 10G illustrated in FIGS. 6A to 6E, as in the multi-core fiber 10B, the arrangement direction of the core portions 1 is easily aligned in the ribbon formation.

A method of manufacturing a multi-core fiber according to an embodiment will be described with an example of manufacturing the multi-core fiber 10B. A first step is first performed which prepares a plurality of core members to be at least a part of the plurality of core portions 1. A second step is subsequently performed which prepares a cladding member to be at least a part of the cladding portion 2B. A third step is subsequently performed which forms a preform using the plurality of core members and the cladding member. A fourth step is subsequently performed which draws a multi-core fiber from the preform.

Each of the steps will be described below. In the first step, for example, a core member is formed which has the same refractive index profile as the refractive index profile formed by the central core portion 1a, the intermediate layer 1b, and the trench layer 3 in the core portion 1. Such a core member is also referred to as a core rod. In the core member, a glass layer to be a part of the cladding portion 2 may be formed in the outermost layer of the glass layer to be the trench layer 3. Such a core rod can be formed, for example, by a vapor-phase axial deposition (VAD) method or an outside vapor deposition (OVD) method.

In the second step, for example, a cylindrical glass rod to be at least a part of the cladding portion 2 is prepared, and a plurality of holes into which a core preform can be inserted is bored in the glass rod along the axis of the cylinder of the glass rod to form a cladding member. Alternatively, in the second step, a glass capillary may be prepared, as one of the core members, which has an inner diameter into which a plurality of core members can be inserted and be a part of the core portion 1.

In the third step, a glass rod is inserted into each of the holes of the cladding member to form a preform. Such a method of forming a preform is also referred to as a piercing method. Alternatively, in the third step, a plurality of core rods is inserted into a glass capillary, and further, a glass rod to be a part of the core portion 1 is inserted between the core rod and the glass capillary and between the core rods to form a preform. Such a method of forming a preform is also referred to as a stacking method.

In the case of the stacking method, the outermost layer of the core preform is generally a glass layer to be a part of the cladding portion 2. In the case of the piercing method, the outermost layer of the core preform may be a glass layer to be a part of the cladding portion 2 or a glass layer to be the trench layer 3. In the case where the outermost layer of the core preform is a glass layer to be the trench layer 3, propagation loss is likely to increase when light passes through the interface between the trench layer 3 and the cladding portion 2B in the manufactured multi-core fiber. In this case, $w/\Lambda$ is set to 0.179 or less, and the effect of suppressing an increase in the propagation loss of the core portion 1 due to the existence of the interface is more effectively exhibited.

In the third step, the outer periphery of the preform is processed so as to have the shape of the cladding portion 2B of the multi-core fiber 10B. The processing can be performed by mechanical polishing, chemical polishing, or others.

In the third step, the preform is preferably formed such that the preform has a volume larger than or equal to 100 km in terms of the length of the multi-core fiber to be drawn. Thus, a long multi-core fiber can be manufactured from one preform, such that it is possible to reduce the manufacturing cost of the multi-core fiber. A preform having such a large volume allows the glass thickness between the holes formed in the glass rod to become sufficiently thick when the piercing method is used, such that, for example, cracks are less likely to occur during the step. In the preform, the volume of a non-defective portion that can be used for manufacturing a multi-core fiber satisfying a desired standard directly becomes the volume of the multi-core fiber. Therefore, the volume required as a non-defective portion of the preform can be calculated from the length and the cladding diameter of the multi-core fiber to be manufactured.

Figure 7:
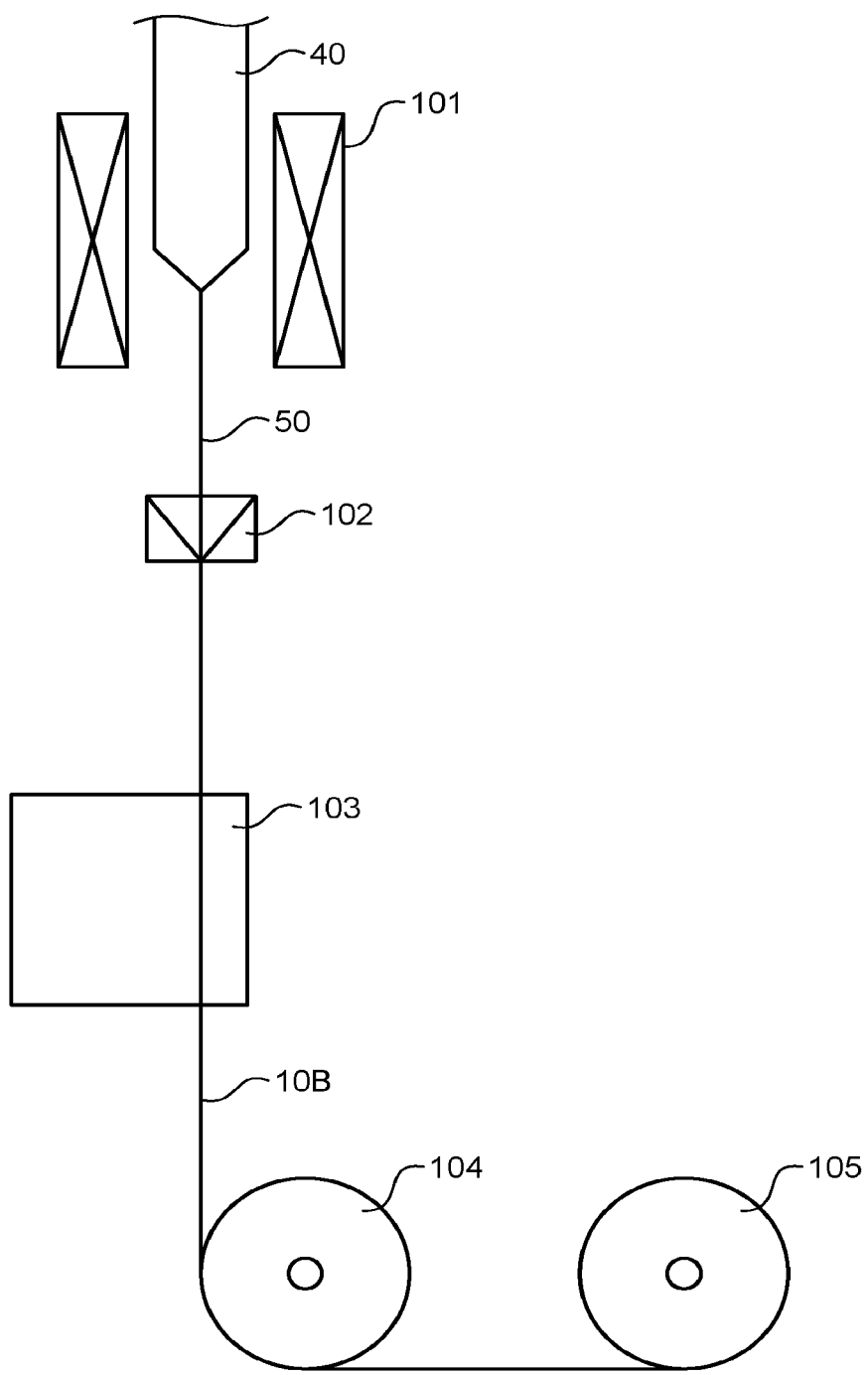
FIG. 7 is an explanatory diagram of a method of manufacturing a multi-core fiber.

The fourth step is performed, for example, by the method illustrated in FIG. 7. In other words, a preform 40 formed in the third step is first set in a drawing furnace 100. One end portion of the preform 40 is then heated and melted by a heater 101 to draw a glass multi-core fiber 50. The glass multi-core fiber 50 is composed of a core portion 1 and a cladding portion 2B. An ultraviolet curing resin is subsequently applied to the outer periphery of the glass multi-core fiber 50 by a resin application device 102. The die in the resin application device 102 has a shape capable of forming the outer shape of the coating layer 3B. The resin applied to the outer periphery of the glass multi-core fiber 50 is subsequently irradiated with ultraviolet rays by an ultraviolet ray irradiation device 103 to be cured, thereby forming the coating layer 3B. The multi-core fiber 10B is subsequently guided to a winding device 105 by a guide roll 104. The winding device 105 includes a bobbin for winding the multi-core fiber 10B. The drawing speed of the multi-core fiber 10B is changed by the rotation speed of the bobbin.

When the multi-core fibers 10, 10A, 10E, 10F, and 10G are manufactured, the shape of the outer periphery of the preform may not be processed in the third step.

In FIG. 2, the refractive index profile is composed of straight lines, but the refractive index profile of an actually manufactured multi-core fiber is not composed of straight lines in many cases. Even in such a case, design parameters such as a, b, c, Δ1, Δ2, and Δ3 can be confirmed by a refractive index profile measured by a profile analyzer or others.

Figure 8:
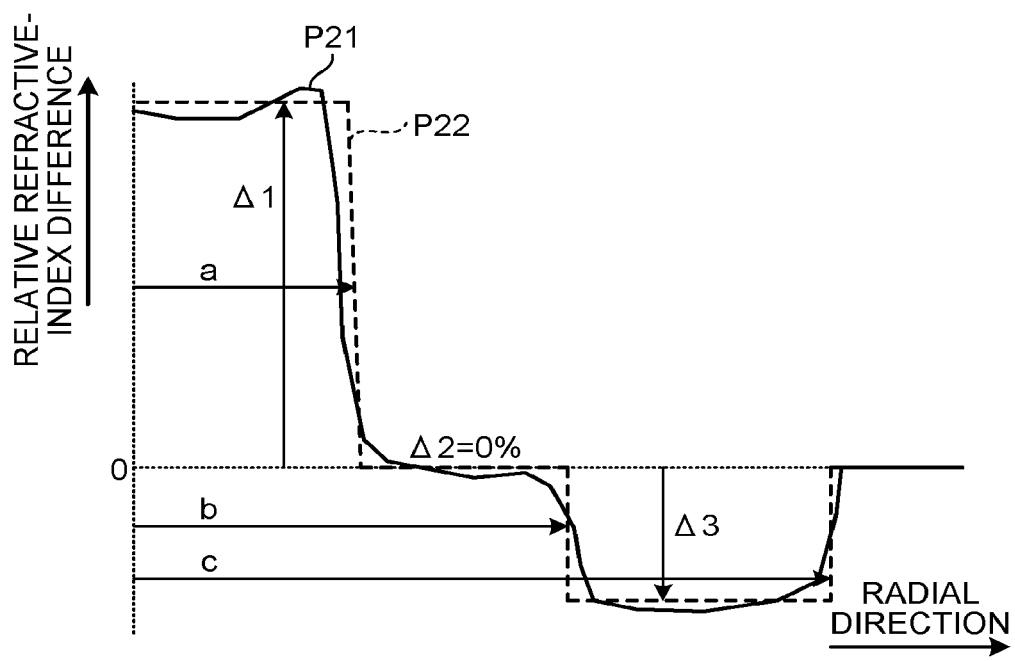
FIG. 8 is an explanatory diagram of a first example of a refractive index profile that can be regarded as a trench type.
Figure 9:
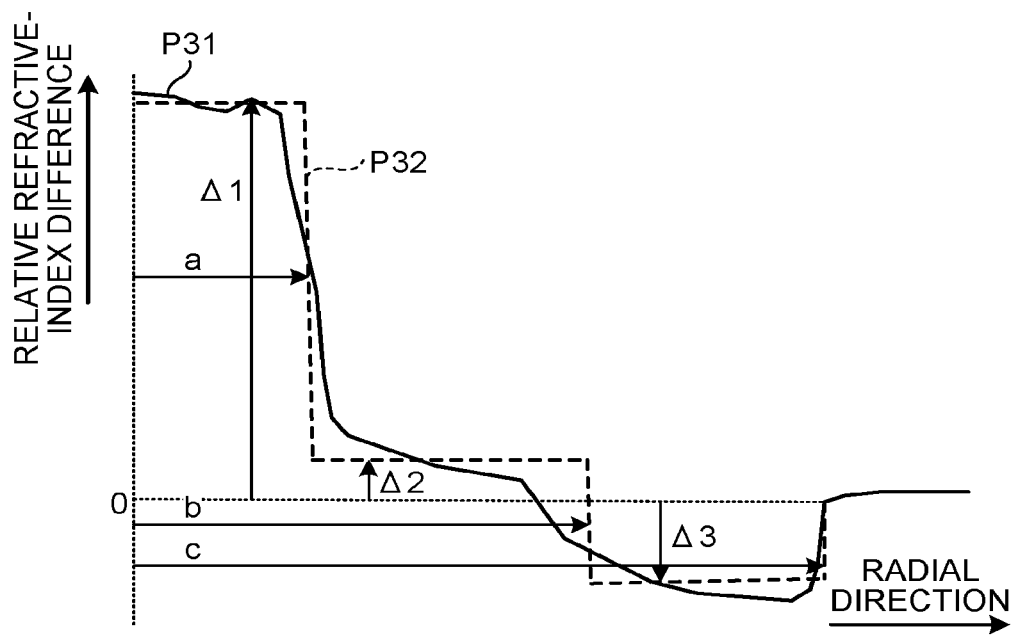
FIG. 9 is an explanatory diagram of a second example of a refractive index profile that can be regarded as a trench type.
Figure 10:
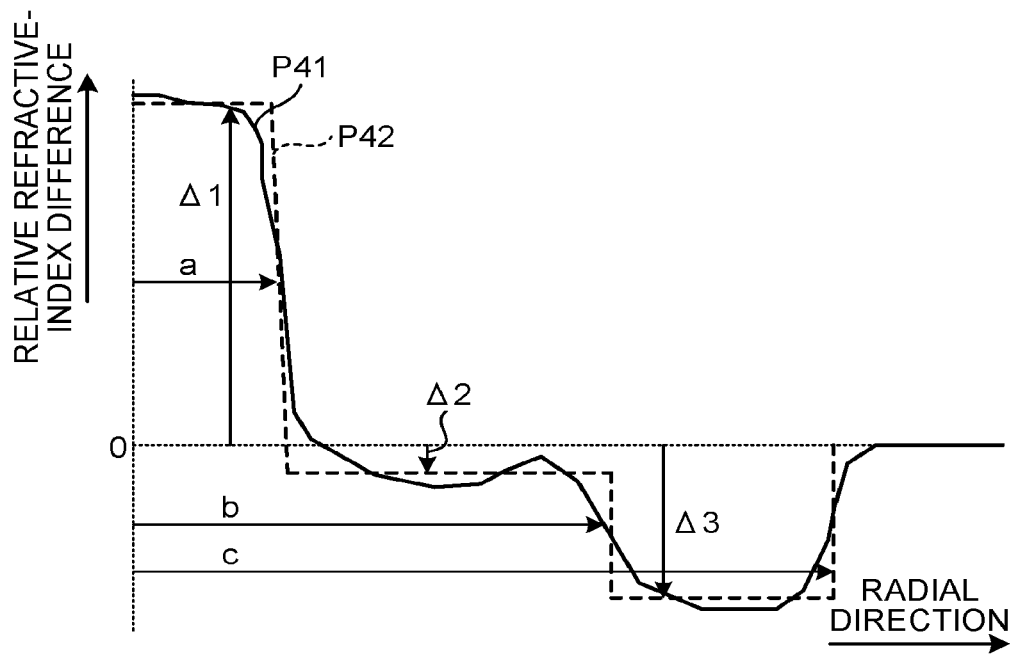
FIG. 10 is an explanatory diagram of a third example of a refractive index profile that can be regarded as a trench type.
Figure 11:
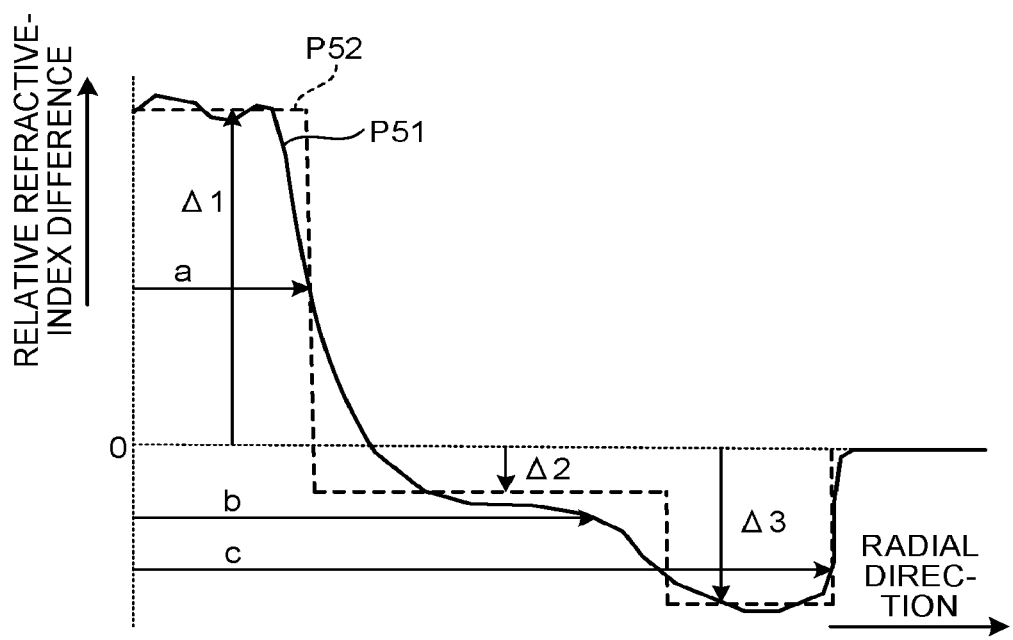
FIG. 11 is an explanatory diagram of a fourth example of a refractive index profile that can be regarded as a trench type.

FIGS. 8 to 11 are explanatory diagrams of first to fourth examples of a refractive index profile that can be regarded as a trench type. In FIG. 8, a profile P22 indicated by a broken line can be specified with respect to an actually measured profile P21 indicated by a solid line. In FIG. 9, a profile P32 can be specified with respect to an actually measured profile P31. In FIG. 10, a profile P42 can be specified with respect to an actually measured profile P41. In FIG. 11, a profile P52 can be specified with respect to an actually measured profile P51.

The actually measured refractive index profiles as illustrated in FIGS. 8 to 11 are not at least partially composed of straight lines, but are recognized as trench-type refractive index profiles by those skilled in the art, to the extent that the design parameter can be specified, and the refractive index profile can be specified by the design parameter.

The present disclosure is not limited to the embodiments described above. An appropriate combination of the above-described components is also included in the present disclosure. Further effects and variations can be easily derived by those skilled in the art. Thus, the broader aspects of the present disclosure are not limited to the embodiments described above, and various modifications may be made.

As described above, the multi-core fiber, the multi-core fiber ribbon, the method of manufacturing the multi-core fiber, and the method of processing the multi-core fiber according to the present disclosure are useful for a multi-core fiber including a core portion that employs a trench structure.

The multi-core fiber according to the present disclosure exhibits an effect of suppressing inter-core crosstalk and suppressing a decrease in manufacturability.

What is claimed is:

1. A multi-core fiber comprising:
   a plurality of core portions each including
     a central core portion,
     an intermediate layer formed on an outer periphery of the central core portion, and
     a trench layer formed on an outer periphery of the intermediate layer; and
   a cladding portion formed on an outer periphery of the plurality of core portions,
   wherein in each of the plurality of core portions, Δ1>Δ2>Δ3 and 0% >Δ3>−0.3% are satisfied, where Δ1 is an average maximum relative refractive-index difference of the central core portion, Δ2 is an average relative refractive-index difference of the intermediate layer, and Δ3 is an average relative refractive-index difference of the trench layer, with respect to the cladding portion,
   w/Λ is 0.179 or less, where Λ is a center distance between most adjacent core portions among the plurality of core portions, and w is a shortest distance between trench layers of the most adjacent core portions, and
   in each of the plurality of core portions, b/a is 1.9 or more and 3.0 or less, and c/a is 3.6 or more and 4.4 or less, where 2a is a central core diameter of the central core portion, 2b is an inner diameter of the trench layer, and 2c is an outer diameter of the trench layer.

2. The multi-core fiber according to claim 1, wherein the Δ1 is 0.35% or more and 0.39% or less.

3. The multi-core fiber according to claim 1, wherein the Δ2 is −0.05% or more and 0.04% or less.

4. The multi-core fiber according to claim 1, wherein a central core diameter of a central core portion of each of the plurality of core portions is set such that an effective cut-off wavelength is 1000 nm or more and 1260 nm or less.

5. The multi-core fiber according to claim 1, wherein in each of the plurality of core portions, a mode field diameter at a wavelength of 1310 nm is 8.6 μm or more and 9.2 μm or less.

6. The multi-core fiber according to claim 1, wherein in each of the plurality of core portions, a bending loss at a wavelength of 1550 nm when bent at a diameter of 20 mm is 1.57 dB/m or less.

7. The multi-core fiber according to claim 1, wherein at a length of 100 km, crosstalk between most adjacent core portions among the plurality of core portions is −25 dB or less.

8. The multi-core fiber according to claim 1, wherein a center distance between most adjacent core portions among the plurality of core portions is 37 μm or more and 41 μm or less.

9. The multi-core fiber according to claim 1, wherein a cladding thickness of the cladding portion on an outer peripheral side is 25 μm or less with respect to a core portion positioned on an outermost peripheral side among the plurality of core portions.

10. The multi-core fiber according to claim 1, wherein in each of the plurality of core portions, a zero-dispersion wavelength is 1300 nm or more and 1324 nm or less, and a dispersion slope at the zero-dispersion wavelength is 0.092 ps/nm$^2$/km or less.

11. The multi-core fiber according to claim 1, wherein the plurality of core portions is three or four in number.

12. The multi-core fiber according to claim 1, comprising a coating layer formed on an outer periphery of the cladding portion.

13. The multi-core fiber according to claim 12, wherein the coating layer includes a non-circular coating portion in which at least a part of an outer surface is deviated from a cylindrical shape along an extending direction of the cladding portion.

14. The multi-core fiber according to claim 1, wherein the cladding portion includes a non-circular cladding portion of a shape in which at least a part of an outer surface is deviated from a cylindrical shape along a non-circular coating portion of the coating layer.

15. The multi-core fiber according to claim 1, wherein a cladding diameter of the cladding portion is 137 μm or less.

16. A method of processing a multi-core fiber, the method comprising
   processing the multi-core fiber according to claim 15 using a jig or device for processing a standard optical fiber having a cladding diameter of 125 μm.

17. A multi-core fiber ribbon comprising the multi-core fiber according to claim 1, a plurality of the multi-core fibers being arranged in parallel.

18. The multi-core fiber ribbon according to claim 17, wherein
   each of the plurality of multi-core fibers includes a coating layer formed on an outer periphery of the cladding portion, and
   the coating layer includes a non-circular coating portion in which at least a part of an outer surface is deviated from a cylindrical shape along an extending direction of the cladding portion, and
   each of the plurality of multi-core fibers is in contact with an adjacent multi-core fiber at the non-circular coating portion.

19. The multi-core fiber according to claim 1, wherein an outer diameter of the cladding portion is 120 μm or more and 137 μm or less.

* * * * *